United States Patent Office

2,743,516
Patented May 1, 1956

2,743,516

PRODUCTION OF COMPOSITE MATERIAL FOR THE MANUFACTURE OF PLAIN BEARINGS

Peter G. Forrester and George D. Denyer, Alperton, Wembley, England, assignors to The Glacier Metal Company Limited, Alperton, Wembley, England, a British company No Drawing. Application June 2, 1952,
Serial No. 291,306

13 Claims. (Cl. 29—528)

This invention relates to plain bearings, and is particularly concerned with the production of composite material for the manufacture of plain bearings or bearing liners of the kind comprising a soft aluminium alloy lining bonded to a relatively strong backing of hard aluminium alloy.

The invention has for its primary object to provide a simple and effective method of producing composite material of this character.

According to the present invention, a method of manufacturing composite material of the character referred to comprises heating a strip, blank or backing of either the hard or the soft aluminium alloy to a temperature substantially below that at which the alloy becomes molten, and applying to or forming thereon a lining or coating of the other aluminium alloy which has been previously heated to a temperature substantially above its melting point, the relative thicknesses of the alloy layers and the temperatures to which the respective alloys are pre-heated being such that a strong bond is obtained with limited diffusion of one alloy into the other.

The invention also includes a method for manufacturing composite material of the character referred to, which comprises producing a duplex slab or ingot of hard and soft aluminium alloys by heating a slab of one alloy to a temperature substantially below that at which it becomes molten and applying a layer of the other alloy heated to a temperature substantially above its melting point, rolling the duplex slab or ingot to secure at least a 10% reduction, heat-treating the rolled slab or ingot at about 465° C. for about 4 hours, and thereafter rolling the heat-treated slab or ingot into a long bi-metal strip of the required thickness, the material being heat-treated at intermediate stages during the rolling to remove the work-hardening effect of rolling, and the strip material produced being finally heat-treated before cutting into blanks and forming into bearings.

The temperatures employed in bonding the two alloys together may vary considerably, not only in dependence on the characteristics of the particular alloys, but also having regard to the relative thicknesses of the hard aluminium and soft aluminium layers. The essential requirement is that the thickness of the applied aluminium alloy layer and the temperature to which it is heated should be sufficient to ensure superficial melting of the solid pre-heated aluminium alloy, or at least sufficient softening of the surface thereof to promote crumbling of the oxide layer, before solidification of the molten aluminium alloy layer takes place. At the same time solidification of the molten aluminium alloy layer should be effected in a time sufficiently short to assure that diffusion between the two alloys is restricted to a relatively thin zone immediately adjacent the bond.

A soft aluminium alloy containing 7% or more of tin may be bonded to a relatively strong and hard aluminium alloy by heating the soft aluminium to a temperature substantially above its melting point before its application to the pre-heated hard alloy, the relative thickness of the hard alloy being sufficient to bring about rapid cooling of the soft aluminium alloy lining before substantial diffusion between the two alloys can take place.

In order to ensure the attainment of a good bond between the backing and lining without unduly critical conditions as regards the temperatures and relative thicknesses, it is preferred to pre-tin the pre-heated aluminium alloy as by wire brushing the surface thereof while immersed in molten tin.

The soft aluminium alloy may contain other metals, such as lead or antimony, in addition to tin.

The method may be carried out by applying the molten soft aluminium alloy to a continuous strip of the hard aluminium alloy in a strip lining machine in which the hard aluminium alloy strip is heated to a suitable temperature below the melting point thereof.

Alternatively, the method may be carried out by pouring the molten soft aluminium alloy on to a preheated blank and the hard aluminium alloy positioned in a suitable die.

After the molten alloy is applied to the pre-heated alloy, the composite material may be quenched as by the application of water sprays to bring it into a soft solution heat-treated condition. Alternatively, the composite material may be allowed to cool and subsequently solution heat-treated at a suitable temperature, and thereafter quenched. The composite material may be subjected to cold working as by rolling to improve the structure and physical properties.

Preferably the composite material, after quenching or cooling, is subjected to cold working as by rolling and is thereafter subjected to heat treatment adapted to improve the structure of the soft aluminium layer and to bring the hard alloy backing material to a soft solution heat-treated condition. The heat treatment may comprise heating at about 465° C. for about 4 hours.

The invention also includes a method for the production of bearings or bearing liners which comprises forming bearings or bearing liners from the composite material produced by any of the methods above defined, and temper-hardening the bearings or bearing liners, for instance, by heating at about 135° C. for about 15 hours.

The invention also includes a method for the production of bearings or bearing liners which comprises forming half shells, bushes or cylinders of the hard aluminium alloy and bonding a lining of soft aluminium alloy thereto by the method above defined. The lining may be applied by a rotary lining process or by die casting.

The invention also includes the composite aluminium alloy material produced according to the invention, and also bearings or bearing liners produced from the said material and having a high tin content in the bearing surface layer.

In carrying the invention into effect according to one embodiment, a hard aluminium alloy, such as an alloy containing, for example, 4.4% copper, 1.5% magnesium and 0.6% manganese, is provided in the form of strip having a thickness of ¼″. The hard aluminium strip is immersed in molten tin at a temperature of about 350° C. and, while so immersed, is subjected to brushing with a rotary steel wire brush operated at low speed, as for example by means of a shaft drive from a motor, the brushing being continued for about 5 seconds or such period as may be necessary to break up the oxide surface while it is out of contact with air, and thus ensure thorough tinning of the surface. The strip, which has been partly pre-heated by the pre-tinning operation, is fed into a strip lining machine in which it is heated by gas burners or by electrical induction heating to a temperature of 450° C. which is well below the temperature of 640° C. at which the alloy becomes molten.

A soft aluminium alloy containing 20% of tin is heated to a temperature of about 750 to 800° C. which is substantially above the temperature of 630° C. at which it becomes molten, and the molten soft aluminium alloy is then applied to the pre-tinned backing as by spreading evenly by means of a nozzle to a depth of ⅛".

The temperature of the soft aluminium alloy is sufficient, having regard to the relative thicknesses of the alloy layers, to effect superficial melting of the pre-heated backing and to raise the temperature of the mass thereof to about 550° C. The soft aluminium alloy solidifies by giving up its heat to the backing, while the superficial melting thereof is restricted to a relatively thin zone adjacent the bond, thus limiting diffusion of one alloy into the other.

The composite strip advantageously is thereafter quenched by water sprays from beneath to bring it into a soft solution heat-treated condition, whereafter the material is cut into blanks and formed into bearings or bearing liners, as by pressing, as rapidly as possible, the bearings or bearing liners produced being allowed to age for about four days to attain a yield strength of about 20 tons per sq. inch prior to normal machining operations.

The bearings or bearing liners produced may be temper-hardened as by heating at about 135° C. for about 15 hours. Instead of quenching the material after the two alloys are brought together, it may be allowed to cool naturally and subsequently solution heat-treated at about 465° C. for about 4 hours, followed by quenching.

In a modification, a duplex slab or ingot of substantial thickness is produced by heating a slab of one aluminium alloy, preferably a hard aluminium alloy for example of the composition above defined, to a temperature of about 450° C. substantially below the temperature at which the alloy becomes molten, and applying a layer of a soft aluminium alloy such as before referred to pre-heated to a temperature substantially above its melting point. The surface of the hard alloy may be pre-tinned if desired. The duplex slab or ingot so produced is rolled to effect at least a 10% reduction and is subjected to heat treatment, for instance, by heating at 450° C. for about 4 hours so as to produce a ductile material which can be rolled into a long bi-metal strip of the required thickness for the manufacture of bearings, the rolling being carried out with heat treatment at intermediate stages to remove the work-hardening effect of rolling. For example, the heat-treated duplex slab or ingot may have a thickness of two inches and may be rolled in several passes to a thickness of one inch and then annealed, for example, by heating at about 250° C. for about 2 hours, and then rolled in several passes to a thickness of ½" followed by a second similar annealing treatment and then rolling finally to a thickness of about ⅛" and again annealing before the strip is cut into blanks for forming into bearings.

In a further modification, a blank of suitable dimensions of a hard aluminium alloy containing, for example, 5% zinc, 2½% copper, 2½% magnesium, 1% nickel, 0.3% titanium and having a thickness of about ¼", is tinned by brushing with a wire brush in a tin bath maintained at about 400° C., the brushing being continued for sufficient time to ensure thorough tinning of the surface. The blank is then placed horizontally in a suitable die and a soft aluminium alloy containing, for example, 20% tin and heated to 750° C. to 800° C. is poured evenly over the pre-tinned and pre-heated blank to a thickness of about ⅛". Preferably the duplex blank so formed is then quenched to bring the harder backing alloy into a soft solution heat-treated condition, whereafter the duplex blank is formed into a bearing or bearing liner as by pressing, followed by temper-hardening at about 135° C. for about 15 hours.

Alternatively, the duplex strip material or blank produced as above described may be allowed to cool naturally after casting and may be subsequently solution heat-treated at about 465° C. for about 4 hours, followed by quenching. The heat-treated duplex blank is then formed into a bearing or bearing liner and temper-hardened at about 135° C. for about 15 hours.

The soft aluminium alloy may be given improved properties by a combination of mechanical working and heat treatment. For example, the duplex blank or strip material may be quenched or naturally cooled and then mechanically worked, for example, by rolling to obtain about 20% reduction in thickness. The material is then heated to about 465° C. for about 4 hours and quenched, thus improving the structure of the soft aluminium layer containing a high percentage of tin, and also bringing the hard alloy backing material to a soft solution heat-treated condition, the blank being thereafter formed into a bearing or bearing liner and temper-hardened as before described.

Bearings or bearing liners may be produced under similar temperature conditions, and with or without pre-tinning of the backing, by lining or by casting in pre-formed half shells, bushes or cylinders either by a rotary lining process or by die casting under gravity or pressure. Pre-forming of such half shells, bushes or cylinders may be effected by die casting, or bushes or cylinders may be cut from wrought tube and half shells pressed from wrought strip.

The invention provides a simple and effective method for producing a composite aluminium alloy bearing material combining mechanical strength with a soft bearing surface and in which the difficulty usually encountered of obtaining a strong bond between the layers is entirely avoided.

The invention also renders it possible to produce an aluminium alloy bearing having a high tin content in the bearing surface layer only so as to economise in the use of tin and, moreover, provides a bearing which, as a whole, has a high coefficient of expansion so as to be particularly suitable for use in light alloy housings.

It will be understood that the invention is applicable for the production of composite aluminium alloy bearing material utilising aluminium alloys of any suitable composition.

Furthermore, it will be understood that the invention is not limited to the particular embodiments hereinbefore described. For example, instead of applying the molten soft alloy lining to the hard aluminium alloy backing, the procedure may be reversed by applying the hard aluminium alloy heated to a temperature well above its melting point on to the soft aluminium alloy heated to a temperature somewhat below its melting point, the relative thicknesses of the layers being such that a strong bond is obtained with limited diffusion in the manner before described.

We claim:

1. A method of manufacturing composite material consisting of a hard aluminium alloy backing and a soft aluminium alloy facing layer bonded to the backing and containing at least 7% of tin, which comprises heating the backing to a temperature substantially below its melting point and applying on to the backing a layer of molten soft aluminium alloy containing at least 7% of tin and heated substantially above the melting point of the hard alloy, the relative thicknesses of the layers and the relative temperatures being such that superficial melting of the backing takes place to produce a strong bond and rapid cooling and solidification of the tin-containing facing layer is brought about to obviate substantial diffusion of tin into the backing layer.

2. A method according to claim 1, wherein, before the application thereto of the molten alloy layer, the heated solid aluminium alloy is tinned by wire brushing the surface thereof while immersed in molten tin.

3. A method according to claim 1, wherein the soft aluminium alloy contains a metal of the group consisting of lead, antimony and copper.

4. A method according to claim 1 wherein molten soft aluminium alloy is applied to a continuous strip of the hard aluminium alloy.

5. A method according to claim 1, wherein the molten soft aluminium alloy is poured on to a heated blank of the hard aluminium alloy.

6. A method according to claim 1, wherein, after the molten alloy is applied to the heated alloy, the composite material is quenched by the application of water sprays to bring it into a soft solution heat-treated condition.

7. A method according to claim 6, wherein the composite material is also subjected to cold working to improve the structure.

8. A method according to claim 7, wherein the composite material, after cooling, is subjected to cold working by rolling, and is thereafter subjected to heat treatment adapted to improve the structure of the soft aluminium layer and to bring the hard alloy backing material to a soft solution heat-treated condition.

9. A method according to claim 8, wherein the heat treatment comprises heating at about 465° C. for about 4 hours.

10. A method according to claim 1, wherein the composite material is allowed to cool and subsequently solution heat-treated at a suitable temperature.

11. A method for the production of bearings or bearing liners which comprises forming bearings or bearing liners from the composite material produced by the method according to claim 1, and temper-hardening the bearings or bearing liners by heating at about 135° C. for about 15 hours.

12. A method for the production of bearings or bearing liners which comprises forming bearing shapes of the hard aluminium alloy and bonding a lining of soft aluminium alloy thereto by the method according to claim 1.

13. A method of manufacturing composite material, consisting of a hard aluminium alloy backing and a soft aluminium alloy facing layer bonded to the backing and containing at least 7% of tin, which comprises producing a duplex slab of the hard and soft aluminium alloys by heating a backing layer of the hard aluminium alloy to a temperature substantially below its melting point and applying on to said backing layer a layer of molten soft aluminium alloy containing at least 7% of tin and heated substantially above the melting point of the hard alloy, the relative thicknesses of the layers and the relative temperatures being such that superficial melting of the backing layer takes place to produce a strong bond between said layers and rapid cooling and solidification of the tin containing facing layer is brought about thereby obviating substantial diffusion of tin into the backing layer, rolling the resulting duplex slab to secure at least a 10% reduction, heat-treating the rolled duplex slab at about 465° C. for about 4 hours, and thereafter rolling the heat-treated slab into a long bi-metal strip of the required thickness, the material being heat-treated at intermediate stages during the rolling to remove the work-hardening effect of rolling, and the strip material produced being finally heat-treated before cutting into blanks and forming into bearings.

References Cited in the file of this patent
UNITED STATES PATENTS

| | | |
|---|---|---|
| 1,333,337 | Pack | Mar. 9, 1920 |
| 1,805,448 | Frary | May 12, 1931 |
| 1,807,689 | Deputy | June 2, 1931 |
| 1,865,089 | Dix | June 28, 1932 |
| 1,997,165 | Brown | Apr. 9, 1935 |
| 2,017,757 | Keller | Oct. 15, 1935 |
| 2,023,512 | Brown | Dec. 10, 1935 |
| 2,443,870 | Reynolds | June 22, 1948 |
| 2,484,118 | Reynolds | Oct. 11, 1949 |
| 2,531,910 | Hensel | Nov. 28, 1950 |
| 2,539,246 | Hensel | Jan. 23, 1951 |
| 2,569,149 | Brennan | Sept. 25, 1951 |